United States Patent
Al Shammary

(10) Patent No.: US 8,800,602 B2
(45) Date of Patent: Aug. 12, 2014

(54) BLOCKED VALVE ISOLATION TOOL

(71) Applicant: Saudi Arabia Oil Company, Dhahran (SA)

(72) Inventor: Mohammad Ahmed Al Shammary, Jubail (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/693,129

(22) Filed: Dec. 4, 2012

(65) Prior Publication Data

US 2013/0160884 A1 Jun. 27, 2013

Related U.S. Application Data

(60) Provisional application No. 61/567,387, filed on Dec. 6, 2011.

(51) Int. Cl.
  *F16L 55/12* (2006.01)
  *F16L 55/124* (2006.01)
  *F16K 7/10* (2006.01)
  *F16L 55/134* (2006.01)

(52) U.S. Cl.
  CPC ............... *F16L 55/124* (2013.01); *F16K 7/10* (2013.01); *F16L 55/134* (2013.01)
  USPC ........ 138/93; 138/94; 137/315.01; 137/15.15

(58) Field of Classification Search
  USPC ............. 138/93, 94, 94.5; 137/315.06, 15.15, 137/15.17, 15.18, 315.01
  See application file for complete search history.

(56) References Cited

U.S. PATENT DOCUMENTS

| | | | | |
|---|---|---|---|---|
| 1,510,212 A | * | 9/1924 | Du Bois | 15/104.31 |
| 1,860,855 A | * | 5/1932 | Gardner | 138/93 |
| 1,946,138 A | * | 2/1934 | Gardner | 138/93 |
| 3,842,864 A | * | 10/1974 | Riegel et al. | 138/93 |
| 5,524,661 A | * | 6/1996 | Tigerholm | 137/15.15 |
| 6,263,896 B1 | * | 7/2001 | Williams | 137/15.15 |
| 6,588,455 B1 | * | 7/2003 | Welfare | 138/94.5 |
| 7,520,301 B2 | * | 4/2009 | Ord et al. | 138/93 |
| 2001/0047825 A1 | | 12/2001 | Williams | |

FOREIGN PATENT DOCUMENTS

DE   4105446 A1   8/1991
EP   0989344 A1   3/2000

OTHER PUBLICATIONS

International Search Report Feb. 13, 2013 and Written Opinion of the International Searching Authority.

* cited by examiner

*Primary Examiner* — Patrick F Brinson
(74) *Attorney, Agent, or Firm* — Abelman, Frayne & Schwab

(57) ABSTRACT

A leaking block valve isolation tool for insertion through a vent duct and blocking valve of a gas flow duct. The isolation tool includes an outer tube having proximal and distal ends, the outer tube having a diameter sized to extend through the vent duct and blocking valve. An inner tube having proximal and distal ends is arranged coaxially with and movable within the outer tube. An inflatable balloon is attached to the distal end of the inner tube, wherein the isolation tool outer tube is insertable through the vent duct to an opening in the gas flow duct. The inner tube is slidably insertable through the outer tube until the balloon is situated within a bore formed through the gas flow duct and is inflatable therein to block any gas leak through the gas flow duct.

13 Claims, 6 Drawing Sheets

BLOCKED VALVE ISOLATION TOOL

I. CROSS-REFERENCE TO RELATED APPLICATION

Figure 1:
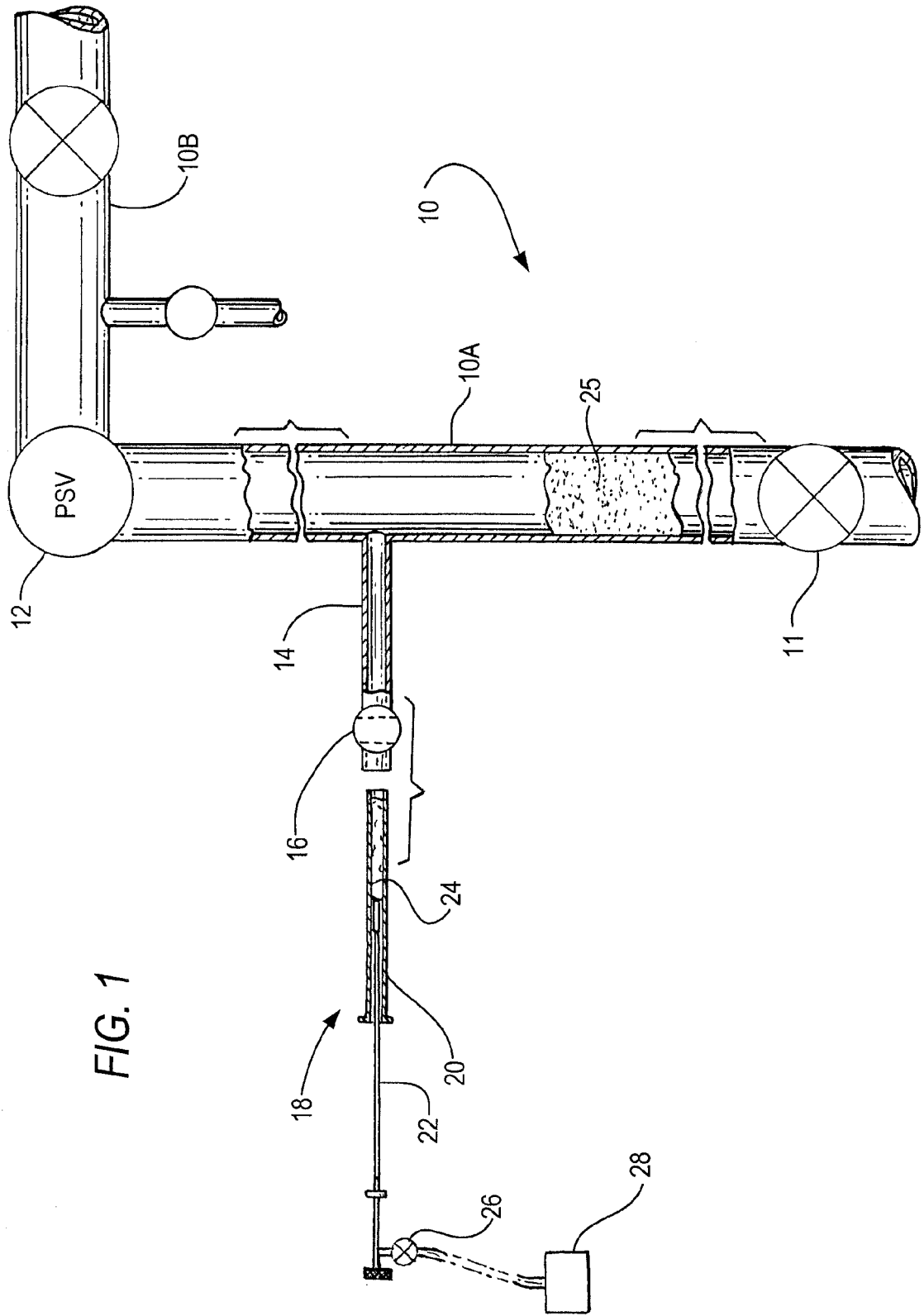

This patent application claims the benefit of U.S. Provisional Application No. 61/567,387, filed Dec. 6, 2011, the content of which is incorporated by reference herein in its entirety.

II. FIELD OF THE INVENTION

This invention is in the field of gas treatment and production facilities, and particularly procedures employed in a portion of a gas flow duct system for isolation and removal of a valve for inspection, repair or replacement.

III. BACKGROUND OF THE INVENTION AND PRIOR ART

In facilities for processing, storing and distributing gaseous products there are numerous relief valves for monitoring, controlling and relieving pressure build-up of gas flowing in duct systems. From time to time such relief valves need to be inspected and removed and replaced. Removal of a valve may expose the system to inconvenient or dangerous leakage of gas from the duct upstream of the removed valve particularly where a blocking valve does not achieve 100% shut-off. A common but usually inconvenient and expensive solution to this leakage problem is to shut down the parent system or at least to shut down the subsystem in the immediate vicinity of the relief valve to be removed. In a large gas treatment or production plant there are a great many such relief valves that need periodic attention as described above, or need removal in emergency situations, costing substantial downtime and expense. The present invention provides a solution that is reliable, substantially less expensive and more practical than conventional practice in gas collection, compression, treatment, distribution and/or storage facilities.

IV. SUMMARY AND OBJECTS OF THE INVENTION

A first object of this invention is to provide a method and apparatus to remove a relief valve from a gas flow duct system or to isolate said valve for inspection with reduced interruption of production and preferably without shutdown of the system. This new method and apparatus may be applicable to isolate any valve or component in a gas flow duct system.

A further object is to provide a method and apparatus for temporarily blocking gas flow in a duct by inserting an element that is inflatable to close the passageway in the bore of the duct, and particularly to blocking potential or actual leaking of gas from block valves upstream and/or downstream of an area of interest of a gas flow duct.

A still further object is to provide a method and apparatus using an inflatable balloon to temporarily seal a duct from a gas leak from an upstream valve. Another object is to provide a method and apparatus of inserting and inflating a balloon in a gas flow duct adjacent a block valve upstream and/or downstream of an area of a relief valve being inspected, repaired and/or replaced.

An additional object in a duct system having spaced apart upstream and downstream portions separated by a relief valve, is to provide a method and apparatus for inspection, repair and/or removal and replacement of said relief valve by removably inserting in said duct an un-inflated sealing balloon upstream of said relief valve and inflating said balloon to block gas flow in said duct's bore to allow attention to said relief valve downstream of said inflated balloon and to similarly insert a sealing balloon downstream of said relief valve.

Another object is to provide an apparatus and method for sealing a gas flow duct upstream of a valve to be inspected, repaired and/or replaced, including providing a vent opening in a wall of said duct, providing a balloon delivery device that inserts a collapsed balloon through said vent opening into the bore of said duct, inflating said balloon to block gas flow in said bore to allow attention to said valve, and collapsing and removing said balloon after replacement of said valve.

One embodiment of the method herein may be described as a method for isolating a relief valve between upstream and downstream segments of a gas flow duct system and temporarily blocking gas flow from said upstream segment, to allow removal and replacement of said relief valve, the method operable with a source of high pressure gas for inflating a balloon, comprising the steps:

a. providing a tubular isolation tool with an un-inflated balloon in its distal end,
b. providing a vent tube communicating into said upstream duct segment (downstream of said blocking valve),
c. providing in said vent tube a blocking valve which is openable to allow insertion of said tubular isolation tool,
d. through said vent tube inserting said isolation tool until said balloon at its distal end is extended into the bore of said upstream duct segment,
e. from said high pressure source of gas, inflating said balloon until it fills said bore of said upstream duct segment and blocks downstream gas flow in said duct segment,
f. removing said relief valve (for inspection and any necessary adjustment or repair),
g. reinstalling an approved relief valve, and
h. deflating and removing said balloon.

In the method described above the isolation tool comprises a hollow tube having open proximal and distal ends, said proximal end is connectable to a source of high pressure air for inflating said balloon.

In the method described above the isolation tool comprises an outer tube that is insertable axially through said vent tube, and an inner tube having proximal and distal ends, with said balloon attached to said distal end of said inner tube, said inner tube being insertable through said outer tube until said distal end thereof and balloon are positioned within the bore of said upstream duct segment.

One embodiment of the invention herein is further defined as a leaking block valve isolation tool, comprising:

a. an outer tube having proximal and distal ends,
b. an inner tube having proximal and distal ends, and axially movable within said outer tube, and
c. an inflatable balloon attached to said distal end of said inner tube, where said isolation tool outer tube is insertable through a vent duct to an opening in a gas flow duct, and said inner tube is insertable through said outer tube until said balloon is situated within the bore of said gas flow duct and is inflatable therein to block any gas leak through said gas flow duct.

A further embodiment of the isolation tool described above, includes a cover to block gas leakage from the vent duct through which the isolation tool is introduced until its balloon is positioned in the gas duct, the cover comprising an elongate elastic hood that encompasses the isolation tool including the junction where it enters the vent duct leading to the leaking gas duct.

V. BRIEF DESCRIPTION OF THE DRAWINGS

Figure 2:
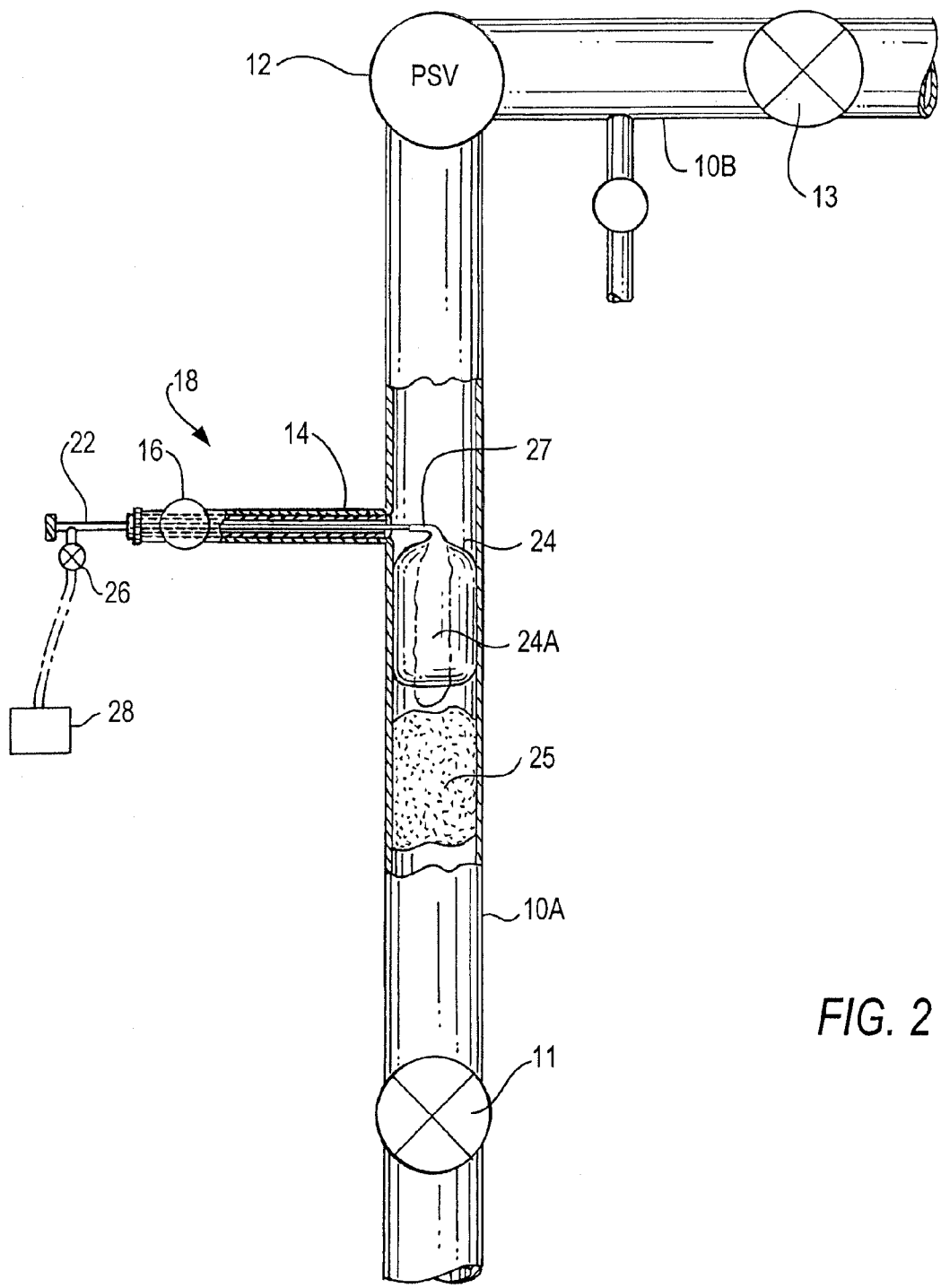
Figure 3:
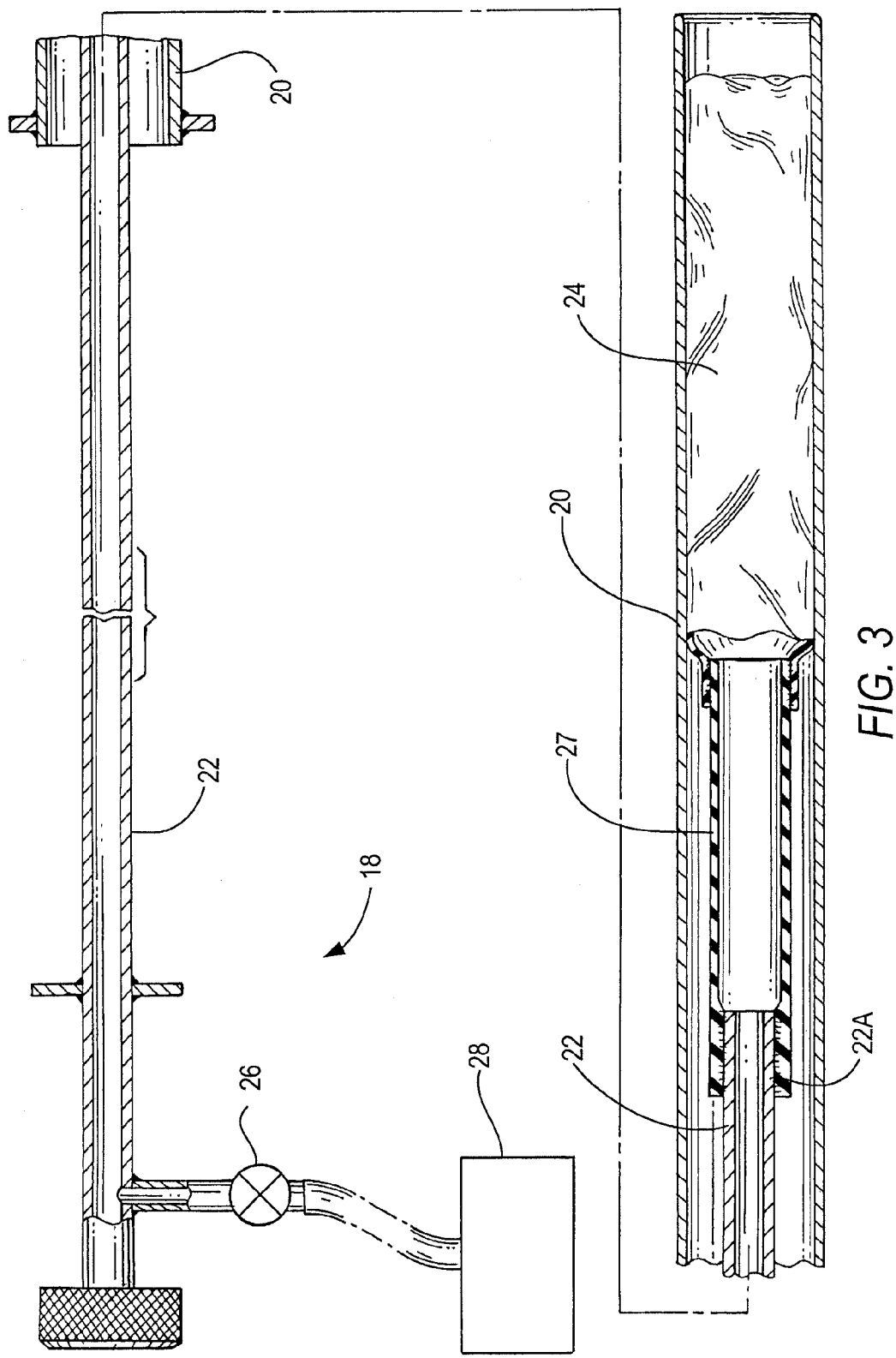
Figure 4:
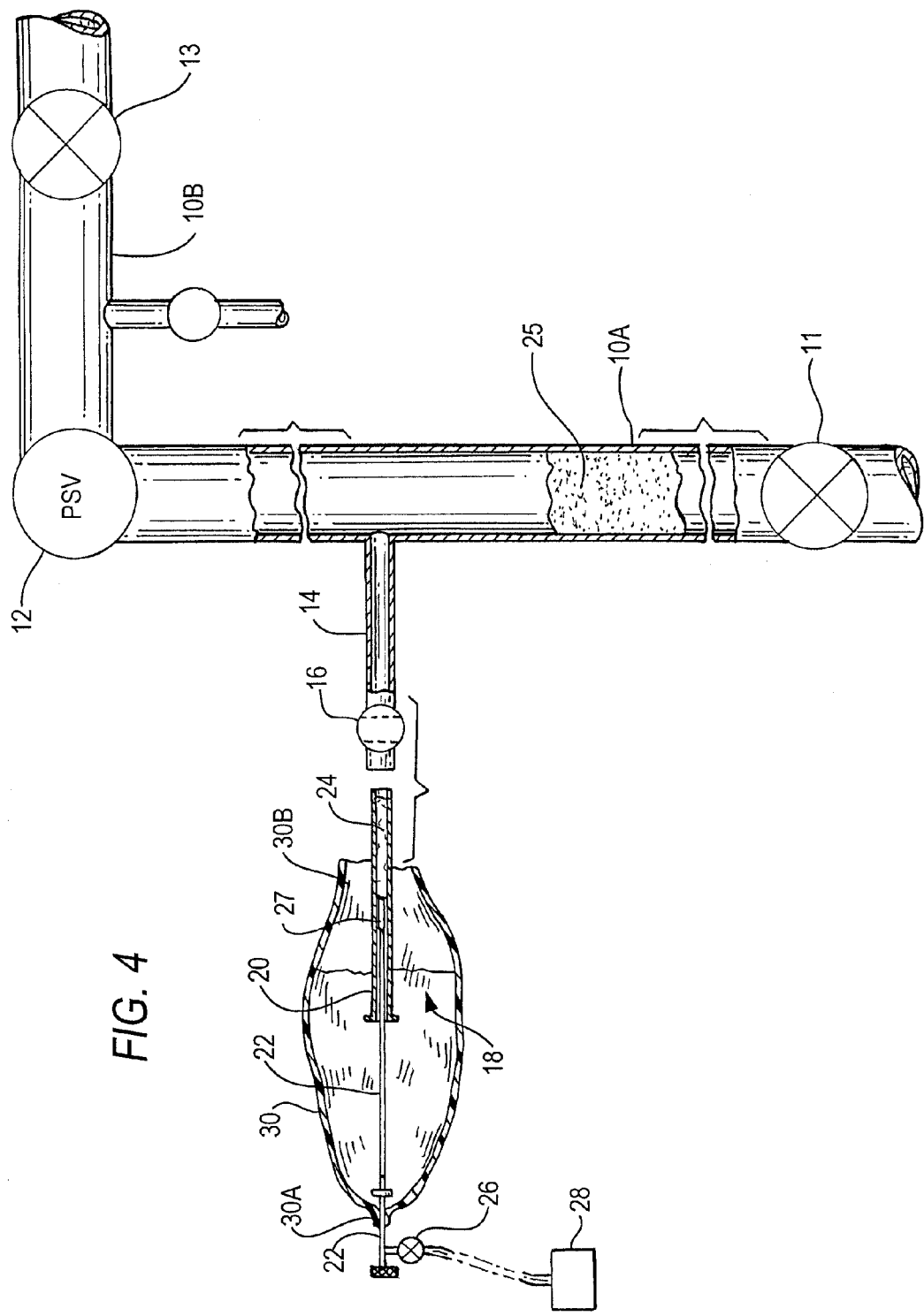
Figure 5:
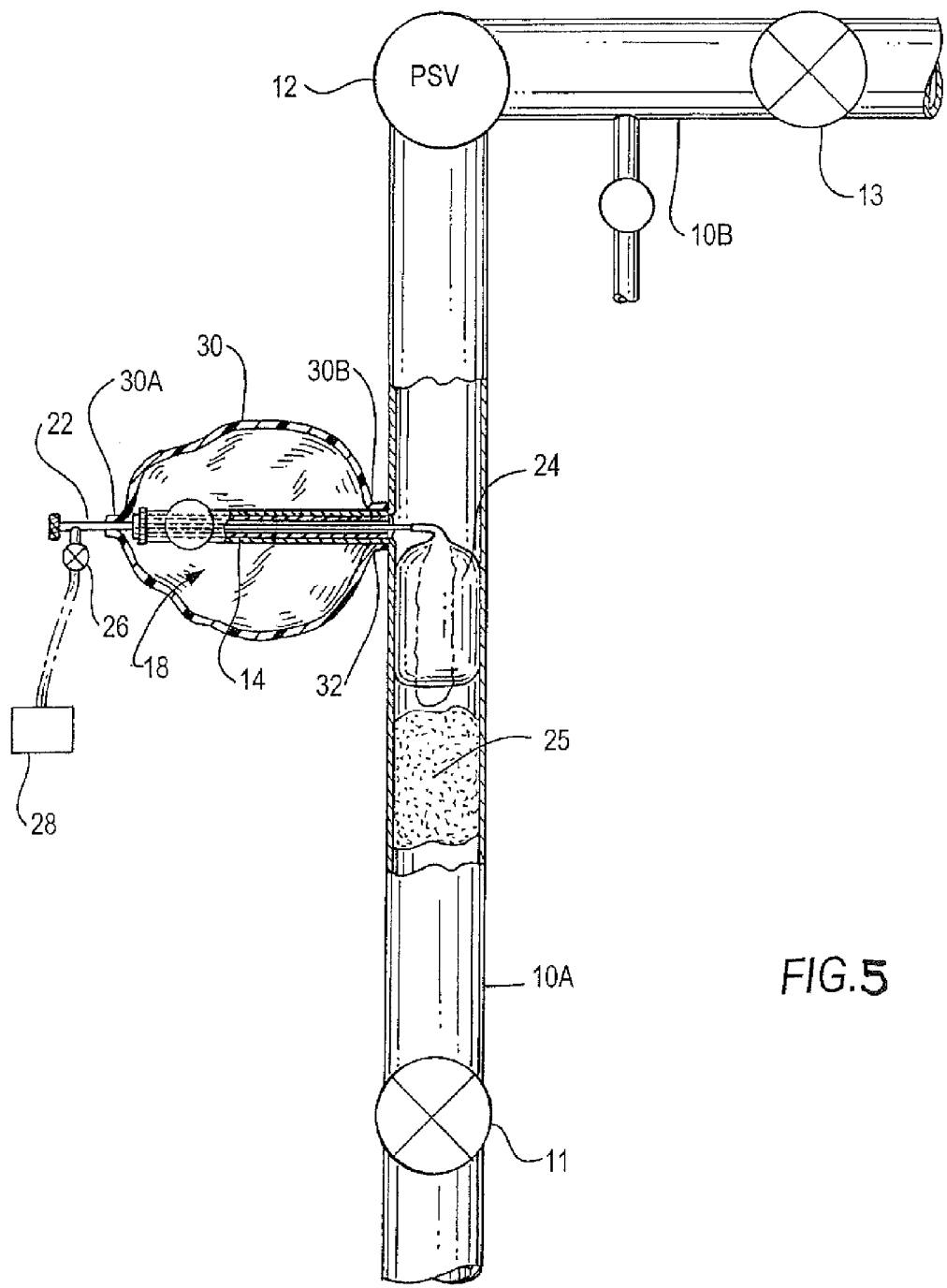

FIG. 1 is a schematic plan view partially in section of a duct system including a relief valve between upstream and downstream blocking valves and the new leaking block valve isolation tool with its balloon not yet inserted or inflated, FIG. 2 is a schematic plan view similar to FIG. 1 showing the balloon in inflated state and sealing the bore of the duct, FIG. 3 is an enlarged schematic plan view in section of the leaking block valve isolation tool with the balloon in collapsed and un-inflated state inside the tubular portion of the tool, FIG. 4 is a schematic plan view similar to FIG. 1 showing a second embodiment with a rubber cover positioned over the proximal end of the leaking block valve isolation tool before it is inserted into the vent duct, and FIG. 5 is a schematic plan view similar to FIG. 4 showing the leaking block valve isolation tool fully inserted through the vent duct, and the cover's distal end secured about said vent duct inward of the vent duct's blocking valve.

Figure 6:
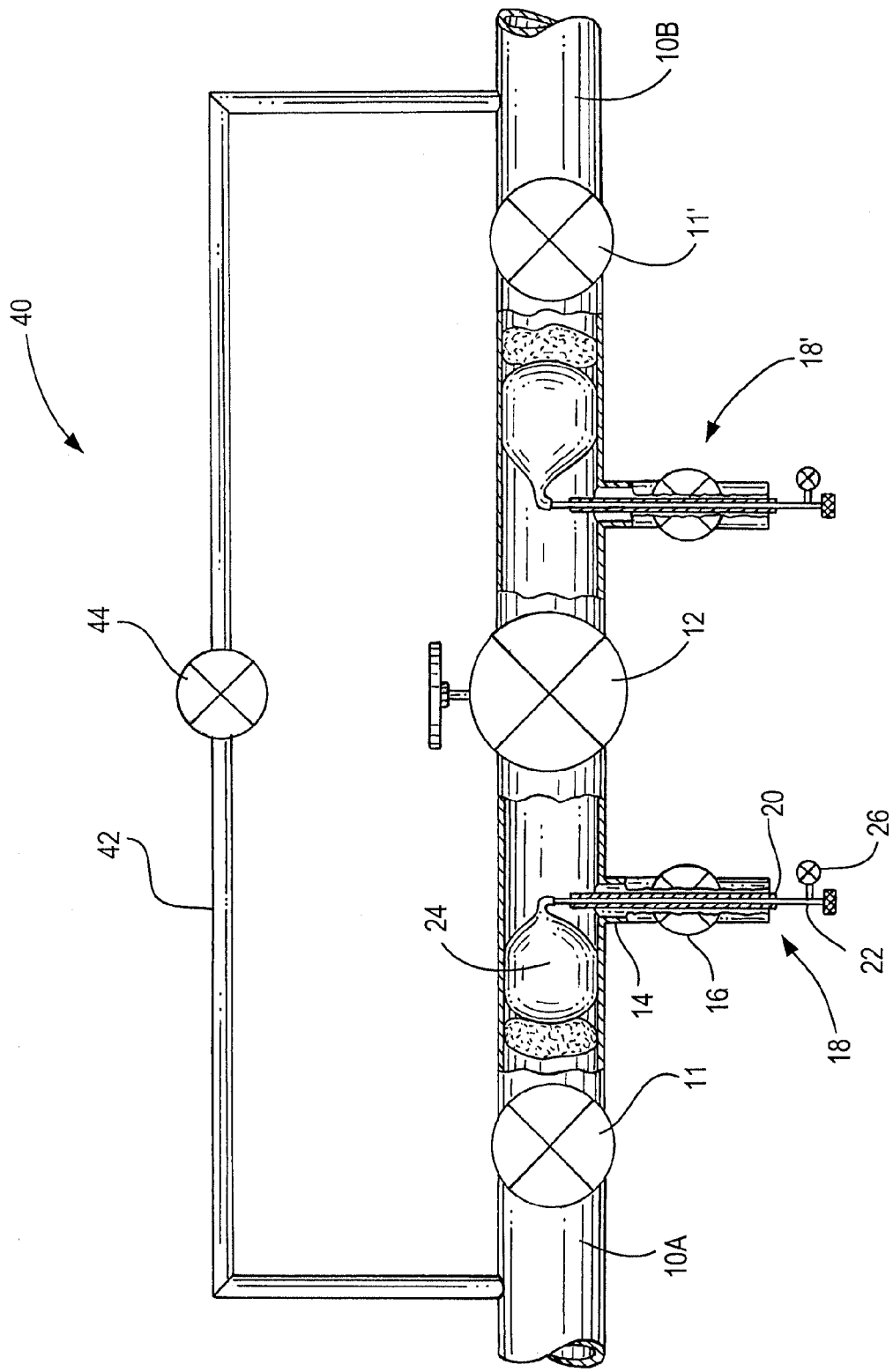

FIG. 6 is a top plan view partially in section of a duct system with a leaking block valve isolation tool installed adjacent both upstream and downstream block valves.

For convenience and clarity similar elements in the different illustrated embodiments in the above referenced figures utilize the same reference numbers.

VI. DETAILED DESCRIPTION OF THE PREFERRED EMBODIMENTS

FIGS. 1 through 3 illustrate a first embodiment of the present invention as a device operable in a duct system through which flows a gas that should be prevented from escaping while a downstream valve is inspected, removed, repaired and/or replaced. The relevant duct system includes an upstream duct 10A, relief valve 12 and further duct 10B downstream of relief valve 12. A gas flows through this duct 10A-10B with relief valve 12 in line to monitor pressure of the gas flow and relieve excessive pressure if such occurs; however, periodically the relief valve needs to be isolated, inspected and as required removed, repaired or replaced and re-installed. A principal object of this invention is to allow an efficient inspection, repair and/or replacement of a relief valve without having to shut down significant portions of the system, particularly the duct 10A-10B where the relief valve is located.

As seen in FIGS. 1 and 2, extending transversely out of duct 10A, is vent duct 14, blocking valve (on/off valve) 16 and leaking block valve isolation tool 18. As seen in FIGS. 1-3 new valve isolation tool 18 comprises external tube 20, internal tube 22, and a balloon 24 at the end of the internal tube 22 inside external tube 20. Also there is an air inlet valve 26 to allow air into internal tube 22, through that tube, to eventually inflate balloon 24. FIG. 6 illustrates another preferred embodiment 40 that is similar to the duct system of FIGS. 1 and 2, except that embodiment 40 utilizes leaking block valve isolation tools 18, 18' respectively adjacent block valve 11 in upstream duct 10A and adjacent bock valve 11' in downstream duct 10'. In this duct system including by-pass valve 44, leaking block valve isolation tools 18 and 18' protect the area of relief valve 12 from upstream or downstream gas leaks.

In operation as seen in FIG. 2, on/off valve 16 is opened, external tube 20 of isolation device 18 is inserted through the opening in the valve 16 until the distal end of tube 20 has entered duct 10A which is upstream of the relief valve 12. Then valve 26 is opened and air from high pressure source 28 flows through internal tube 22 and inflates balloon 24 where it is situated in the bore of duct 10A.

Inflation pressure is sufficient to seal balloon 24 against the inner walls of duct 10A and block gas (service fluid of the gas treatment operation) from leaking downstream of valve 11 or into area of relief valve 12. This preferred embodiment inflation pressure is at least 20 pounds per square inch gauge (psig) to be greater than the up to 20 psig in the upstream duct. Then it is safe to remove and replace relief valve 12 without leakage of gas 25. After completion of inspection, removal, repair and/or replacement of valve 12, balloon 24 is deflated, and isolation device 18 is withdrawn back out through valve 16. Valve 16 is then closed.

FIG. 1 illustrates valve 16 in its closed state as indicated by the set of parallel lines extending through valve 16 and transversely of the duct 14 axis. Also, shown in FIG. 1 is the isolation tool positioned to be inserted through valve 16. Balloon 24 is attached to the distal end of inner tube 22.

FIG. 2 illustrates isolation tool 18 fully inserted through now-open valve 16 (as seen by the set of parallel lines extending axially through valve 16) and through duct 14 with the distal end of inner tube 22 situated within the bore of duct 10A, and with balloon 24 fully inflated and blocking the bore of duct 10A from gas flow indicated by reference 25 toward relief valve 12.

FIG. 3, an enlarged view of isolation tool 18, shows collar 27 that may be formed of plastic that couples balloon 24 to distal end 22A of inner tube 22. This collar facilitates the balloon, when inserted in the bore of duct 10A, to drop into the position shown in FIG. 2 and seal against the wall surfaces of the bore.

Also shown in FIGS. 1-3 is the balloon inflation means comprising a source of compressed air 28 and valve 26 to allow air flow from compressed air source 28 through inner tube 22 to balloon 24 after it is inserted into the bore of duct 10A.

In this preferred embodiment inner tube 22 has ¼ inch I.D., outer tube 20 has ½ inch O.D., and balloon 24 is inflated to at least 20 psig, in a duct system where the gas leak pressure is less than 20 psig the compressed air source 28 may be a compressor, storage tank or other apparatus.

When desired to deflate and retract balloon 24, air in the balloon can be allowed to escape or can be sucked out by means not shown.

In the duct system of FIGS. 1 and 2, duct 10A has upstream blocking valve 11 which can be closed, but if it leaks balloon 24 of isolation tool 18 will provide sufficient blockage of gas leaking downstream toward valve 12 or through vent duct 14.

FIGS. 4 and 5 illustrate a second embodiment of the new invention which has the features of the embodiment of FIGS. 1-3 plus a rubber cover 30 designed to create a gas seal about valve isolation tool 18, so that gas which leaks or flows through blocking valve 11 cannot escape out through duct 14 and/or through valve 16 or other parts of isolation tool 18.

FIG. 4 shows cover 30 as a balloon-like element encompassing the proximal part of isolation tool 18, with the cover's proximal end 30A secured about the near end of inner tube 22 and its distal end 30B (shown stretched open for clarification) encompassing part of outer tube 20. FIG. 5 shows isolation tool 18 fully inserted through duct 14, and the distal end 30B of cover 30 secured about the near end of duct 14. FIG. 5 illustrates how cover 30 blocks escape of any gas that flows or leaks past valve 11 into duct 14, or flows upstream from relief valve 12 and into and through duct 14 and into components of isolation tool 18. The cover's distal end 30B would preferably be secured to duct 14 before valve 16 is opened and thus before insertion of isolation tool 18 into duct 14.

If the first embodiment disclosed in FIGS. 1-3 is employed without cover 30 of the second embodiment shown in FIGS. 4 and 5, there is some risk of gas escaping through vent duct 14 when insertion tool 18 is inserted. In such event the operator should position himself up-wind of the open vent valve 16.

The present invention allows a pressure relief valve or other valve or duct component to be isolated for inspection, testing, removal, repair and/or replacement, in as little as 15-30 minutes without interruption or shutdown of the relevant duct system. Prior art procedures for the same result typically take several days and since it is common in large gas production, treatment, storage and distribution facilities to require a great many of these procedures to cut the gas flow and purge the line where the inspection or incident will occur. The present invention will allow greatly reduced downtime of the facility, and thus will allow significant reduction of cost and inconvenience.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

The invention claimed is:

1. A valve isolation tool, operable with a source of compressed gas, to block gas flow leakage occurring through a leaking valve in a gas flow duct system which system includes (a) a duct with a central bore, (b) a leaking valve in said duct, (c) a duct segment of said duct downstream of said leaking valve, (d) a vent duct which has proximal and opposite distal ends, said distal end intersecting and being in fluid communication with the central bore said duct segment, and (e) an on/off valve in said vent duct, said on/off valve having open and closed states, said valve isolation tool comprising:
   (1) an outer tube having proximal and distal ends,
   (2) an inner tube having proximal and distal ends and movable axially within said outer tube,
   (3) an un-inflated balloon attached to said distal end of said inner tube which is fluid coupled to said source of compressed gas,
      wherein said isolation tool outer tube is insertable through said on/off valve when said valve is in its open state and thence through the said vent duct to said opening in the gas flow duct, and said inner tube is axially movable through said outer tube until said balloon is situated within the bore of said duct segment where said balloon is inflatable to block any gas leak through said duct segment, and
   (4) a flexible cover having a proximal end securely disposed airtight about the proximal end of the inner tube, and a distal end of securely disposed airtight about the proximal end of the outer tube.

2. The valve isolation tool of claim 1 operable with a high pressure gas source, further comprising a further valve having an outlet coupled to the proximal end of the inner tube and an inlet communicably coupled to said high pressure source.

3. The valve isolation tool of claim 1 further comprising a collar having proximal and distal ends, the proximal end of the collar being secured to the distal end of the inner tube and the distal end of the collar being configured for retaining the balloon in a deflated state.

4. The valve isolation tool of claim 3, wherein the distal end of the collar comprises an outwardly extending flange for securing the balloon thereon.

5. The valve isolation tool of claim 1, wherein the proximal end of the inner tube comprises a handle.

6. The valve isolation tool of claim 1, wherein the flexible cover is an elongated elastic hood.

7. The valve isolation tool of claim 1, wherein the balloon is inflatable to a size corresponding to an interior surface of the gas flow duct to thereby prevent the flow of gasses past the inflated balloon.

8. A method in a gas flow duct system operable with a source of compressed gas, for blocking gas flow leakage through a leaking valve in a gas flow duct system which includes (i) a duct that has a duct segment downstream of said leaking valve and (ii) a vent duct having proximal and distal ends, said distal end of said vent duct in fluid communication with the bore of said duct segment through an opening in the wall of said duct segment, said vent duct including an on/off valve intermediate its ends, comprising the steps of:
   (a) providing a tubular isolation tool which includes an outer tube having proximal and distal ends, an inner tube having proximal and distal ends and axially movable within said outer tube, and an un-inflated balloon attached to said distal end of said inner tube;
   (b) inserting said distal ends of the outer and inner tubes of said valve isolation tool through said on/off valve and thence through said vent tube until said un-inflated balloon is extended into said bore of said duct segment;
   (c) providing a flexible tubular cover having proximal and distal ends, wherein the proximal end of the flexible cover is securely disposed airtight about the proximal end of the inner tube, and the distal end of the flexible cover is securely disposed airtight about the junction where the inflation tool enters the vent duct, and
   (d) inflating said balloon from said high pressure source of gas until the balloon fills said bore of said duct segment and blocks gas flow leakage in said duct segment.

9. The method of claim 8, wherein the step of inserting comprises first inserting the distal end of the outer tube through said vent duct and opened on/off valve, and then slidably inserting the distal end of the inner tube coaxially within the outer tube which extends through said on/off valve, until the deflated balloon passes into the bore of said duct segment.

10. The method of claim 8, wherein said providing step includes attaching said balloon about an outwardly extending flange formed at the distal end of the inner tube.

11. The method of claim 8 further comprising inspecting, repairing and/or replacing a relief valve located along the downstream segment of the gas flow duct system.

12. The method of claim 11 further comprising deflating and removing said balloon from said duct segment of said gas flow duct system.

13. A valve isolation tool, operable with a source of compressed gas, to block gas flow leakage occurring through a leaking valve in a gas flow duct system which system includes (a) a duct with a central bore, (b) a leaking valve in said duct, (c) a duct segment of said duct downstream of said leaking valve, (d) a vent duct which has proximal and opposite distal ends, said distal end intersecting and being in fluid communication with the central bore said duct segment, and (e) an on/off valve in said vent duct, said on/off valve having open and closed states,
said valve isolation tool comprising:
   (1) an outer tube having proximal and distal ends,
   (2) an inner tube having proximal and distal ends and movable axially within said outer tube,
   (3) an inflatable balloon attached to said distal end of said inner tube which is fluid coupled to said source of compressed gas, wherein said isolation tool outer tube is insertable through said on/off valve when said valve is in its open state and thence through said the vent duct to said the gas flow duct, and said inner tube is axially movable through said outer tube until said balloon is situated within the bore of said duct segment where said balloon is inflatable to block any gas leak through said duct segment from said leaking valve, and (4) a flexible cover having a proximal end securely disposed airtight about the proximal end of the inner tube, and a distal end of securely disposed airtight about said vent duct proximal of said on/off valve.

* * * * *